US010486815B2

(12) United States Patent
Bang et al.

(10) Patent No.: US 10,486,815 B2
(45) Date of Patent: Nov. 26, 2019

(54) AIRCRAFT ANGLED CONFERENCE TABLE CONFIGURATION

(71) Applicant: Bombardier Inc., Dorval (CA)

(72) Inventors: Seung Joon Bang, Laval (CA); Tim Michael Fagan, Beaconsfield (CA); Bruce Malek, Senneville (CA)

(73) Assignee: BOMBARDIER INC., Dorval (CA)

( * ) Notice: Subject to any disclaimer, the term of this patent is extended or adjusted under 35 U.S.C. 154(b) by 267 days.

(21) Appl. No.: 15/306,156

(22) PCT Filed: Apr. 22, 2015

(86) PCT No.: PCT/IB2015/052944
§ 371 (c)(1),
(2) Date: Oct. 24, 2016

(87) PCT Pub. No.: WO2015/162574
PCT Pub. Date: Oct. 29, 2015

(65) Prior Publication Data
US 2017/0057639 A1    Mar. 2, 2017

Related U.S. Application Data

(60) Provisional application No. 61/984,434, filed on Apr. 25, 2014.

(51) Int. Cl.
*B64D 11/06*    (2006.01)
*A47B 5/04*    (2006.01)
(Continued)

(52) U.S. Cl.
CPC ............ *B64D 11/0638* (2014.12); *A47B 5/04* (2013.01); *A47B 9/00* (2013.01); *A47B 13/088* (2013.01);
(Continued)

(58) Field of Classification Search
CPC .. A47B 1/00; A47B 5/04; A47B 13/10; A47B 87/002; A47B 5/00; A47B 13/08;
(Continued)

(56) References Cited

U.S. PATENT DOCUMENTS 2,288,563 A    6/1942  Fall
D149,416 S    4/1948  Jones
(Continued)

FOREIGN PATENT DOCUMENTS

CN    201914461 U    8/2011
DE    4125783 A1    2/1993
(Continued)

OTHER PUBLICATIONS

PCT international Search Report and Written Opinion dated Jul. 24, 2015 re: International Application No. PCT/IB2015/052944.
(Continued)

*Primary Examiner* — Richard R. Green
*Assistant Examiner* — Steven J Shur
(74) *Attorney, Agent, or Firm* — Norton Rose Fulbright Canada LLP

(57) ABSTRACT

An aircraft table configuration includes a first table section and a second table section. The first and second table sections are hingedly connected along a first hinge line so that the second table section is configurable between a deployed, opened position and a folded, closed position. The first table section presents a first angled side and the second table section table presents a second angled side. The first angled side defines a first angle with respect to the first hinge line, and the second angled side defines a second angle with respect to the first hinge line. The first angled side and the second angled side are opposite to one another on either side of the first hinge line, wherein the first and second angled sides are adapted to define an aisle width in the aircraft. The
(Continued)

aisle width does not change between the open position and the closed position.

20 Claims, 6 Drawing Sheets

(51) Int. Cl.
    *A47B 9/00*          (2006.01)
    *A47B 13/08*        (2006.01)
    *A47B 13/10*        (2006.01)
    *A47B 37/00*        (2006.01)

(52) U.S. Cl.
    CPC .............. *A47B 13/10* (2013.01); *A47B 37/00* (2013.01); *A47B 2200/0079* (2013.01)

(58) Field of Classification Search
    CPC ......... A47B 13/00; A47B 9/00; A47B 13/088; A47B 37/00; A47B 2200/0079; B64D 11/0638; B64D 11/04; B64D 11/065; B61D 37/00; B60N 3/001; B60N 3/002; B60N 3/00
    USPC ....................................................... 244/118.6
    See application file for complete search history.

(56) References Cited

U.S. PATENT DOCUMENTS

| | | | |
|---|---|---|---|
| D282,420 S | 2/1986 | Melland | |
| D338,358 S | 8/1993 | Schroeder et al. | |
| 5,322,021 A * | 6/1994 | Jackson | B60N 3/002 108/44 |
| 5,947,416 A * | 9/1999 | Kraft | A47B 1/00 108/143 |
| 5,967,054 A * | 10/1999 | Rosenfeld | B60R 5/045 108/115 |
| D462,972 S | 9/2002 | Smyth et al. | |
| 6,530,330 B2 | 3/2003 | Sepe et al. | |
| D506,081 S | 6/2005 | Moore | |
| D576,821 S | 9/2008 | Fissette et al. | |
| D617,577 S | 6/2010 | Day | |
| D730,668 S | 6/2015 | Fletcher | |
| 2001/0010419 A1 | 8/2001 | Kasuya | |
| 2003/0000430 A1 | 1/2003 | Sepe et al. | |
| 2005/0087650 A1 | 4/2005 | Quan et al. | |
| 2005/0279216 A1 | 12/2005 | Miller | |
| 2006/0225625 A1 | 10/2006 | Bazzell et al. | |
| 2009/0078169 A1 | 3/2009 | Osborne et al. | |
| 2009/0107366 A1 | 4/2009 | Fissette et al. | |
| 2009/0223417 A1 | 9/2009 | Muirhead | |
| 2009/0249982 A1 * | 10/2009 | Palethorpe | A47B 5/00 108/44 |
| 2010/0326333 A1 | 12/2010 | St. Louis | |
| 2012/0030708 A1 | 2/2012 | Margis et al. | |

FOREIGN PATENT DOCUMENTS

| | | | |
|---|---|---|---|
| DE | 19930432 C2 * | 4/2003 | ............. B60N 3/001 |
| DE | 19930432 C2 | 4/2003 | |
| DE | 102008044710 A1 * | 3/2010 | ............. B60N 3/001 |
| DE | 102008044710 A1 | 3/2010 | |
| FR | 2845112 B1 | 7/2005 | |
| GB | 498449 | 1/1939 | |
| JP | 2001204552 | 7/2001 | |
| WO | 2012050587 A1 | 4/2012 | |
| WO | WO-2012050587 A1 * | 4/2012 | ............. B64D 11/00 |
| WO | 2013186531 A1 | 12/2013 | |

OTHER PUBLICATIONS

English translation of Chinese patent document No. CN 201914461 dated Aug. 3, 2011; www.google.ca/patents . . . .

English translation of German patent document No. DE 10 2008 044 710 dated Mar. 4, 2010; www.google.ca/patents . . . .

English translation of Japan patent document No. JP 2001204552 dated Jul. 31, 2001; www63.orbit.com . . . .

The State Intellectual Property Office of the People's Republic of China, Notification of First Office Action dated Apr. 16, 2018 re: application No. 201580022132.7.

English translation of France patent document No. FR 2845112 dated Sep. 26, 2002, accessed on Jun. 8, 2018, https://www32.orbit.com/?locale=en&ticket=abefdadf-cdd3-49fb-8965-999be082f986#PatentDocumentPage.

English translation of Germany patent document No. DE 19930432 dated Apr. 30, 2003, accessed on Jun. 7, 2018, https://patents.google.com/patent/DE19930432C2/en?oq=DE19930432.

English translation of Germany patent document No. DE 4125783 dated Feb. 4, 1993, accessed on Jun. 7, 2018, https://patents.google.com/patent/DE4125783A1/en?oq=DE4125783.

* cited by examiner

DEPLOYED

AIRCRAFT ANGLED CONFERENCE TABLE CONFIGURATION

CROSS-REFERENCE TO RELATED APPLICATION

This application is a national phase application under 35 U.S.C. 371 of International Patent Application No. PCT/IB2015/052944 filed on Apr. 22, 2015, which claims priority from U.S. Provisional Patent Application Ser. No. 61/984,434, filed on Apr. 25, 2014, the entire content of which is incorporated herein by reference.

FIELD OF THE INVENTION

The present invention concerns a configuration for the interior architecture of an aircraft, specifically, the layout of an angled conference table within an aircraft.

BACKGROUND

It is well known to those skilled in the art that the interior configurations for most aircraft are designed around a basic plan that maximizes the seating capacity of an aircraft. In one typical configuration, an aircraft includes an interior where there is a central aisle with seating areas on either side of the aisle. The seats typically are configured such that they face the front of the aircraft and are positioned in a side-by-side arrangement, facing toward the front or forward section of the aircraft fuselage. In a larger aircraft, such as commercial aircraft, there may be room for a second aisle. In these larger, commercial aircraft, manufacturers typically follow the traditional approach. Specifically, the seats face the front of the aircraft and are disposed in a side-by-side arrangement.

In smaller aircraft employed for private use, whether personal or business, for example, there is less of a concern for maximized seating capacity. Moreover, there is often a desire to deploy conference tables, for instance in a booth configuration. However, the smaller sizes of the aircraft present a challenge to interior designers, because there is a smaller head room capacity, which limits the configurations that may be reasonably employed. Likewise, a large conference table can block or reduce the width of an aisle.

SUMMARY

Accordingly, it is an object of the present invention to provide an angled conference table that has a configuration which provides for a consistent aisle clearance between its deployed and folded positions. By creating a symmetrical inboard shape relative to the folding line of a conference table, the aisle clearance within the aircraft is maintained.

In one example, an aircraft table configuration includes a first table section and a second table section. The second table section is hingedly connected to the first table section along a first hinge line so that the second table section is configurable between a deployed, open position and a folded, closed position. The first table section presents a first angled side, and the second table section presents a second angled side. The first angled side defines a first angle with respect to the first hinge line, and the second angled side defines a second angle with respect to the first hinge line. The first angled side and the second angled side are opposite to one another on either side of the first hinge line, wherein the first and second angled sides are adapted to define an aisle width in the aircraft. The aisle width does not change between the open position and the closed position.

In the foregoing aircraft table configuration, the second angle may be more acute than the first angle. The aircraft table configuration may further comprise a pillar mounted underneath the first table section to support the first table section. The pillar may be extendable between a raised position and a lowered position. The first and second angles may be substantially symmetric to each other relative to the first hinge line. The first and second table sections may be directly adjacent to and abut each other.

The aircraft table configuration may further comprise a third table section hingedly connected to the first table section along a second hinge line. The second hinge line may be parallel to the first hinge line. The second hinge line is on the opposite side of the first table section from the second table section. The third table section is configurable between a deployed, open position and a folded, closed position. The third table section presents a third angled side, wherein the third angled side defines a third angle with the second hinge line and the first angled side defines a fourth angle with the second hinge line, wherein the third angle is less than or equal to the fourth angle relative to the second hinge line. The third angle may be more acute than the fourth angle.

In another example, a paired aircraft configuration comprises a first table top and a second table top. Each of the first and second table tops comprises a first table section, and a second table section hingedly connected to the first table section along a first hinge line so that the second table section is configurable between a deployed, open position and a folded, closed position. The first table section presents a first angled side, and the second table section presents a second angled side. The first angled side defines a first angle with respect to the first hinge line. The second angled side defines a second angle with respect to the first hinge line. The first angled side and the second angled side are disposed opposite to one another on either side of the first hinge line. The first and the second angled sides are adapted to define an aisle width in the aircraft, and the aisle width does not change between the open position and the closed position.

The second angle may be more acute than the first angle.

The first and second angles may be substantially symmetric to each other relative to the first hinge line.

The first table top and the second table top may further comprise a third table section hingedly connected to the first table section along a second hinge line. The second hinge line may be parallel to the first hinge line. The second hinge line is on the opposite side of the first table section from the second table section. The third table section is configurable between a deployed, open position and a folded, closed position. The third table section presents a third angled side, wherein the third angled side defines a third angle with the second hinge line and the first angled side defines a fourth angle with the second hinge line. The third angle is less than or equal to the fourth angle relative to the second hinge line.

The third angle may be more acute than the fourth angle.

The paired aircraft table may comprise a pillar mounted underneath the first table section to support the first table section. The pillar may be extendable between a raised position and a lowered position.

Those skilled in the art will appreciate other aspects of the invention based on the discussion that follows and the drawings appended hereto.

BRIEF DESCRIPTION OF THE DRAWINGS

One or more embodiments of the present invention will now be described in connection with the figures appended hereto, in which.

DETAILED DESCRIPTION

The description of the invention set forth below focuses on one or more examples of the invention. These examples are intended to be exemplary of the invention and not limiting of the scope of the invention. As should be apparent to those skilled in the art, the examples described herein present aspects of the invention for which there are numerous variations and equivalents. Those variations and equivalents are intended to be encompassed by the present invention.

Figure 1:
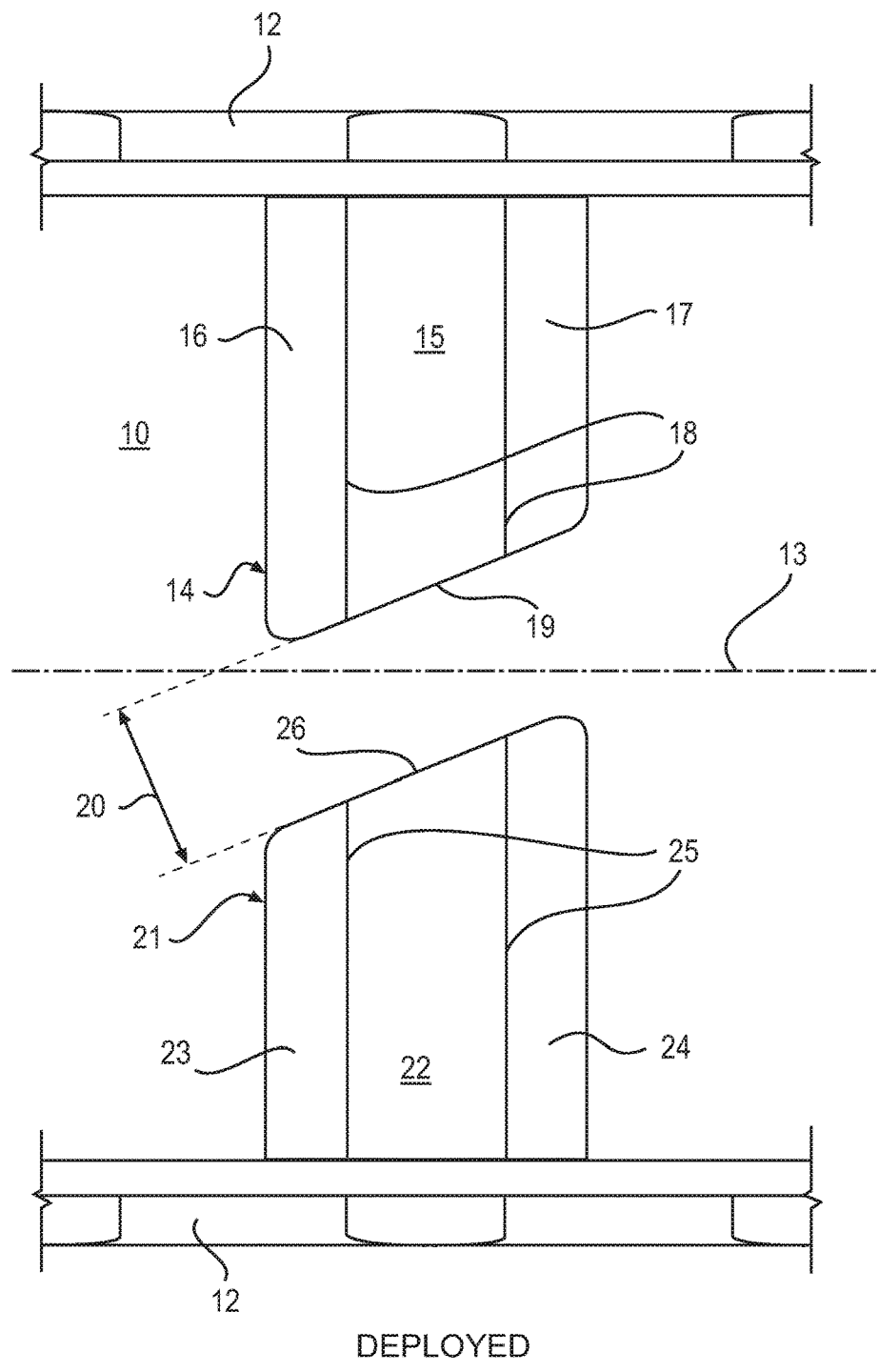
FIG. 1 is a top plan view of a prior art, angled conference table in an open, deployed position.
Figure 2:
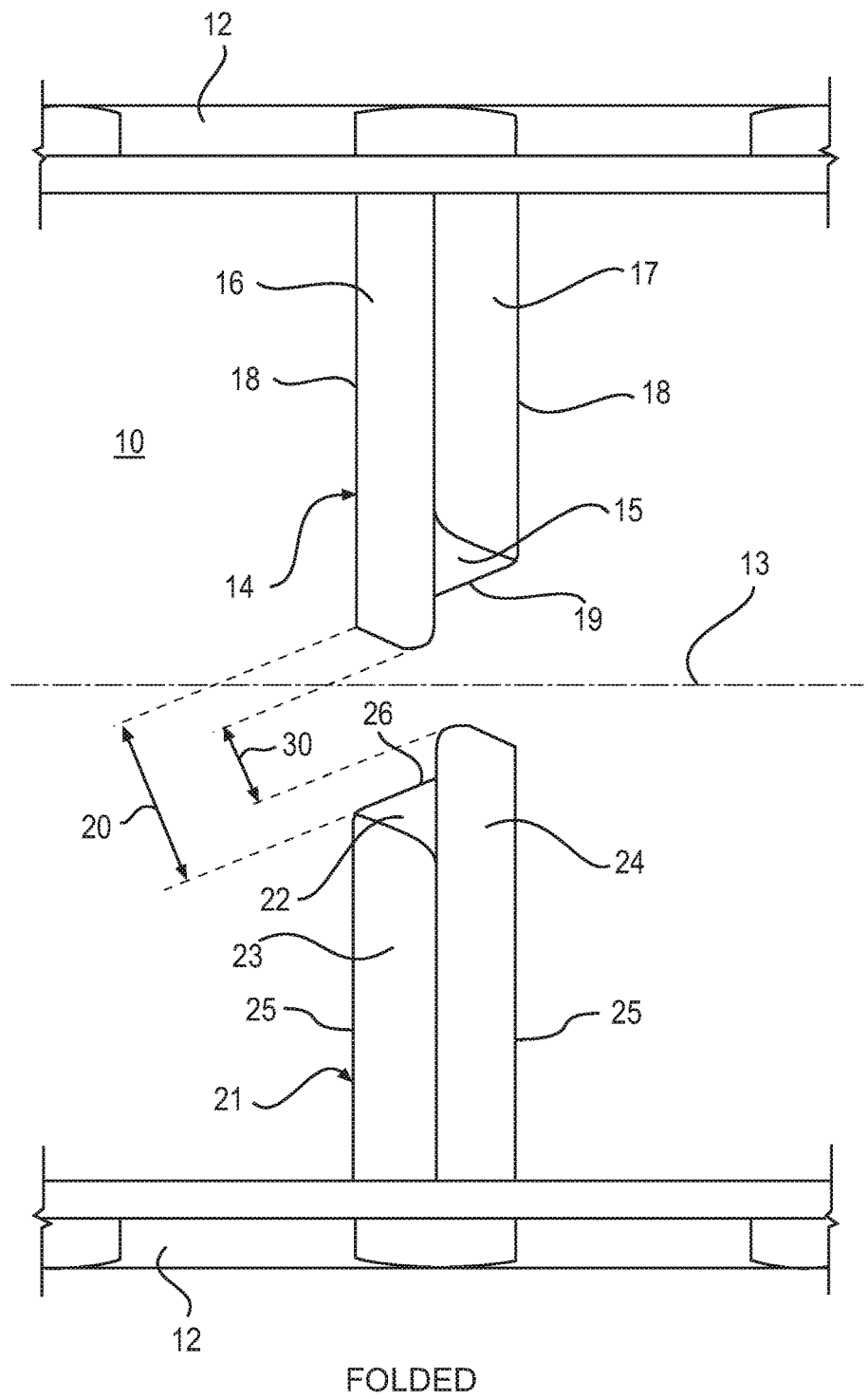
FIG. 2 is a top plan view of the angled conference table illustrated in FIG. 1, shown in a folded, closed position.

Turning to FIGS. 1 and 2, there is shown pairs of angled conference tables 14, 21 that are previously known. Specifically, aspects of this arrangement for the conference tables 14, 21 is disclosed in U.S. Patent Application Publication No. 2013/0256456 at FIG. 7.

As shown in a top plan view, the aircraft 10 includes two fuselage walls 12 that run parallel with the longitudinal axis 13 of the aircraft. The tables 14 and 21 are mounted in the aircraft 10, perpendicular to the longitudinal axis 13, at a position along the longitudinal length 13 of the aircraft 10.

In FIG. 1, the table 14 includes a center section 15 that is hingedly connected, along hinge lines 18, to two table sections 16 and 17. The table 14 defines an angled side 19 that, together with the angled side 26 of table 21, defines a border of the width 20 of the aisle. Similarly, the table 21 includes a center section 22 connected along hinge lines 25 to two table sections 23 and 24.

As may be appreciated from FIG. 1, the conference tables 14, 21 are illustrated in an open, deployed position, accessible by passengers on either side thereof.

FIG. 2 is the same in all respects to FIG. 1, except that the tables 14, 21 are illustrated in folded, closed positions. As shown, the table sections 16 and 17 are folded up on top of the center section 15 of table 14 and the table sections 23 and 24 are folded onto the top of center section 22 of table 21. As is readily apparent from FIG. 2, the aisle width 20 defined by the angled sides 19 and 26 of tables 14 and 21 is substantially wider than the aisle width 30 defined by the end of sections 16 and 24 that now a more narrow aisle width 30 when one or more of the tables 14, 21 are configured in the folded, closed positions.

Figure 3:
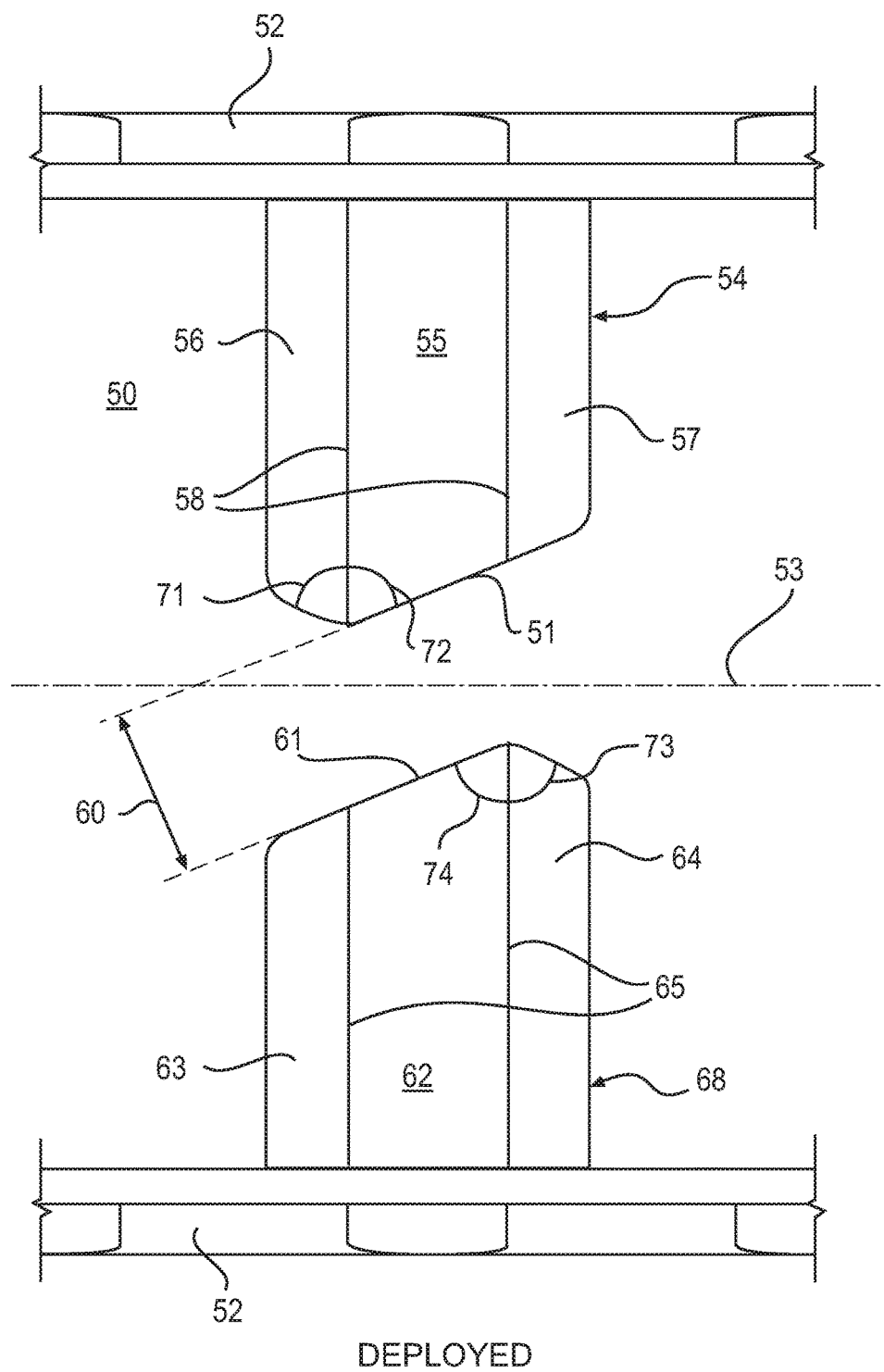
FIG. 3 is a top plan view of an example of a conference table according to the present invention, shown in an open, deployed position.
Figure 4:
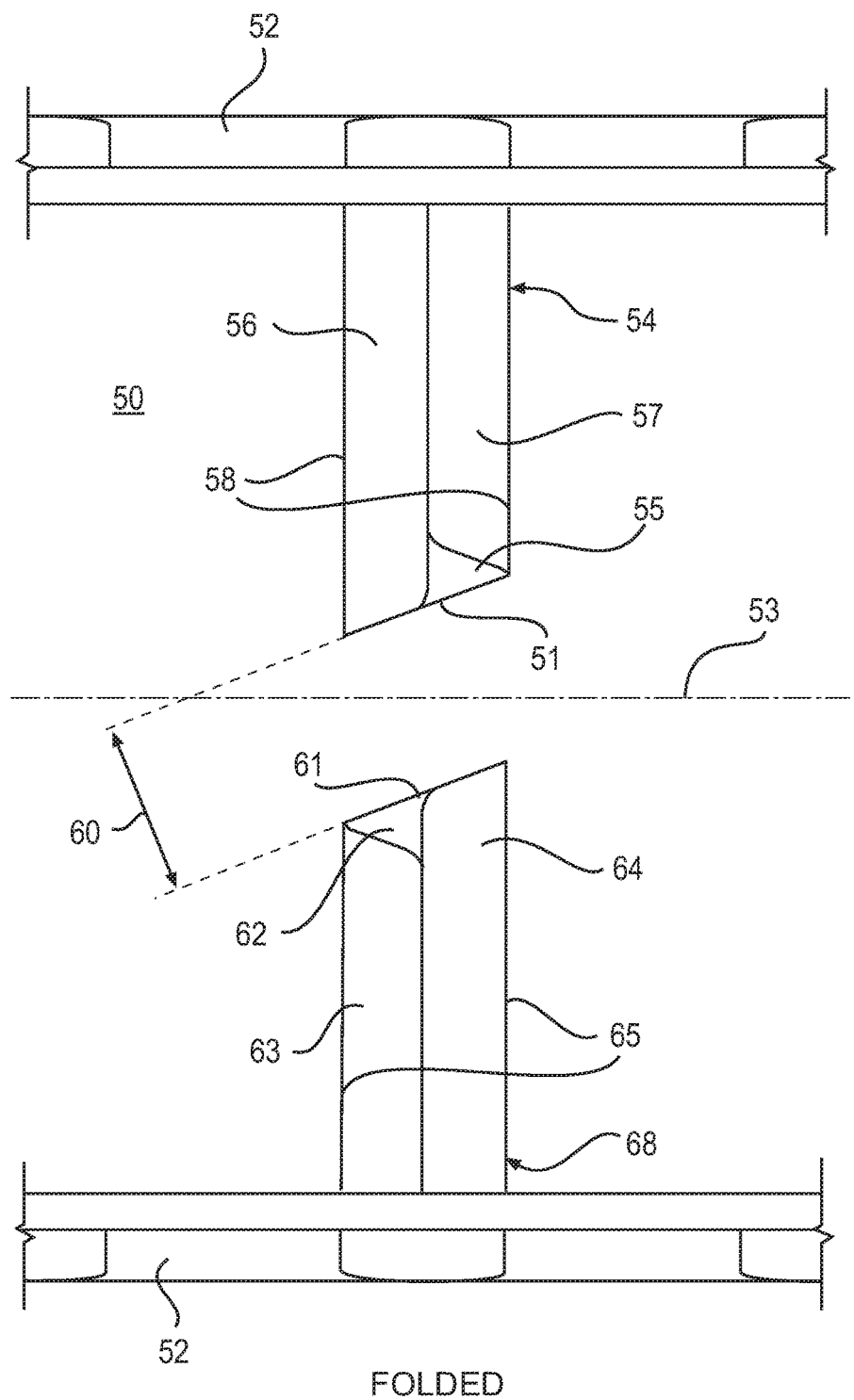
FIG. 4 is a top plan view of the conference table illustrated in FIG. 3, shown in a folded, closed position.

Turning now to FIGS. 3 and 4, a pair of tables 54, 68 consistent with the present invention are shown.

In a top plan view comparable to FIG. 1, FIG. 3 shows an aircraft 50 having fuselage sidewalls 52 defining a central axis 53 along the longitudinal length of the aircraft 50.

In FIG. 3, the table 54 includes a center section 55 that is connected along two hinge lines 58 to two table top sections 56 and 57. Similarly, the table 68 includes a center table top portion 62 that is connected along two hinge lines 65 to two table top sections 63 and 64. The tables 54, 68 are illustrated in open, deployed positions.

With continued reference to FIG. 3, the hinge lines 58 and 65, respectively, are substantially perpendicular to the central axis 53. Also, the tables 54 and 68 are mounted opposite to one another at a predetermined position along the longitudinal axis 53 of the aircraft 50 so that they are positioned next to each other. The aisle width 60, as defined by the angled ends 51 and 61 of the tables 54 and 68, respectively, is shown.

It is noted that the sections 55, 56, 57 of the table 54 and the sections 62, 63, 64 of the table 68 have linear shapes that are parallel to one another. It is contemplated in one or more alternative embodiments that the shapes of the sections 55, 56, 57 62, 63, 64 may vary from the illustrated shapes while remaining within the scope of the present invention. In addition, while the tables 54, 68 are shown as being oriented substantially perpendicularly to the longitudinal axis 53, the tables 54, 68 may be angled with respect to the longitudinal axis 53 without departing from the scope of the present invention. In addition, the tables 54, 68 need not be positioned at the same longitudinal location within the aircraft 50. To the contrary, it is contemplated that the tables 54, 68 may be located at offset positions along the longitudinal axis 53 of the aircraft 50. Finally, the present invention is not intended to be limited to the employment of both tables 54, 68 together. To the contrary, only one of the tables 54, 68 may be employed without departing from the scope of the present invention.

In FIG. 4, the table top sections 56 and 57 are shown folded over onto the center section 55 on table 54. This is the folded, closed position of the table 54. Likewise, the table top sections 63 and 64 are folded over onto center section 62 of table 68. This is the folded, closed position of the table 68.

As shown in FIG. 4, the aisle defined by the angled end portions 51 and 61 of the tables 54 and 68 respectively is the same width 60 as the width 60 shown in FIG. 3. There is no loss of aisle width because the table top sections 56, 64 are configured so that, when in the folded, closed position, they do not present any portion that diminishes the width 60 of the aisle as is the case with the tales 14, 21.

In the example illustrated in FIG. 4, an angle 72 (angle 72 is only visible in FIG. 3) defined by the angled end portion 51 of the center section 55 with respect to the hinge line 58 and an angle 71 defined by the end of the table top section 56 with respect to the hinge line 58 are the same. In other words, the two angles 71 and 72 are symmetric so that they overlap substantially identically as shown in FIG. 4. The same is true for table 68 where angles 73 and 74 are symmetric and the same and thus overlap each other substantially identically as shown in FIG. 4. As should be apparent, so as to not lose any aisle width 60, it is contemplated that the angles 71, 73 of the folded table top sections 56, 64 are the same as the angles 72 and 74 as shown. If the angles are larger, then a portion of the table top sections 56 or 64 will protrude into the aisle space and reduce the width of the aisle. In an alternative embodiment, the angles 71, 73 may be more acute than, or stated alternatively, are inferior to the angles 72, 74. In this alternative embodiment, the ends of the table top sections 56, 64 will not align with the ends of the center sections 55, 62. Here, there will be a different overlap, but the width 60 of the aisle may be maintained as in the illustrated embodiment.

Figure 5:
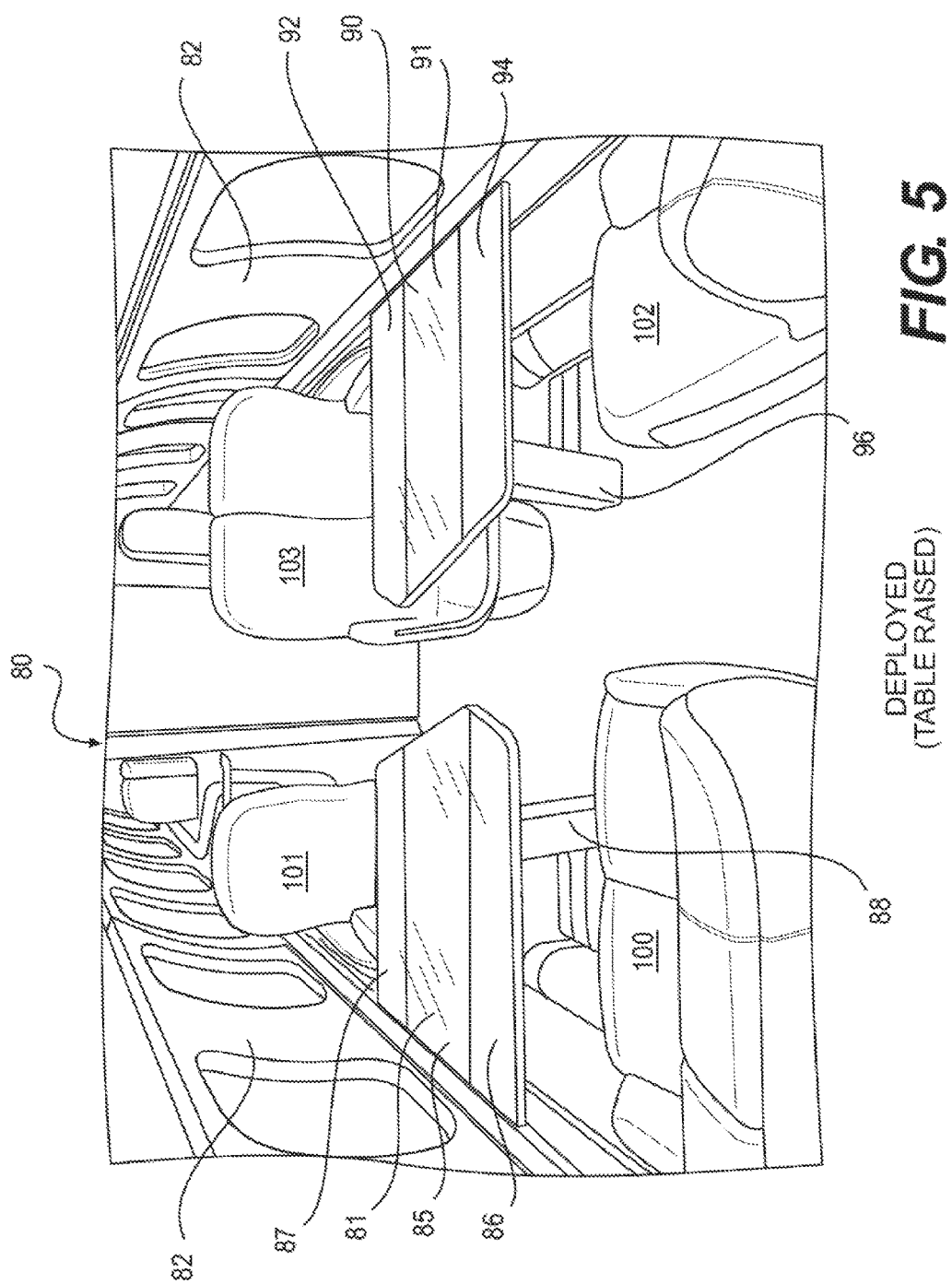
FIG. 5 is a perspective view of the conference table illustrated in FIG. 3, shown in the open, deployed position.
Figure 6:
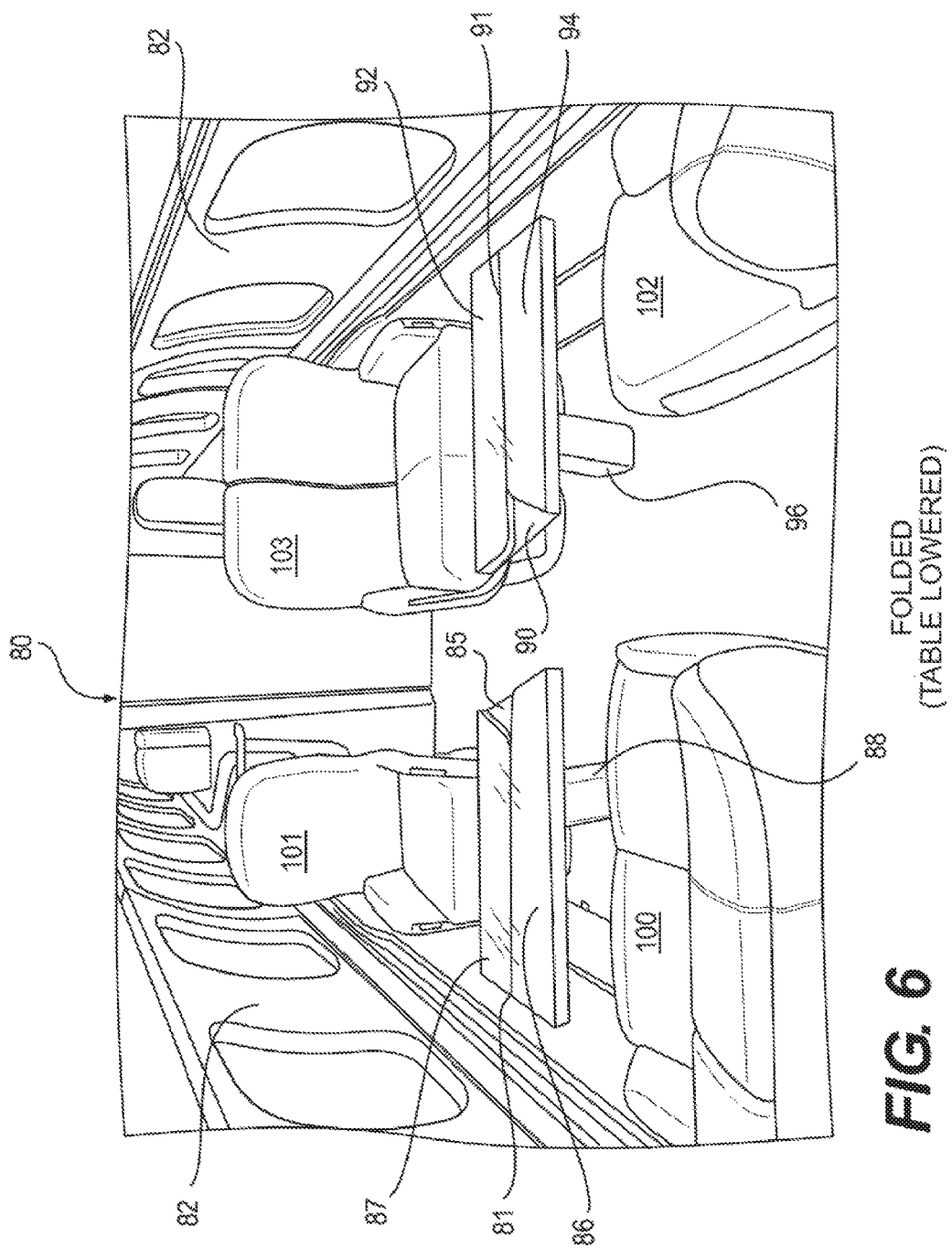
FIG. 6 is a perspective view of the conference table illustrated in FIG. 3, shown in the folded, closed position.

FIGS. 5 and 6 provide perspective views that generally illustrate two tables 81 and 91 in their open and raised positions (FIG. 5) as compared with their folded and lowered positions in FIG. 6. The tables 81, 91 are contemplated to be consistent with the tables 54, 68.

Turning first to FIG. 5, the perspective view of the interior of the aircraft 80 includes the sidewalls 82. The tables 81 and 91 are shown mounted between passenger seats 100 and 101 and 102 and 103, respectively. The table 81 is mounted onto a pillar 88. The table 91 is mounted onto a pillar 96. As shown, the table 81 includes a center section 85 and two folding table top sections 86 and 87. The table 91 includes a center section 90 and two folding table top sections 92 and 94.

FIG. 6 is similar in most respects to FIG. 5 in that the table 81 is mounted between the passenger seats 100 and 101 and the table 91 is mounted between the passenger seats 102 and 103. The difference between FIG. 5 and FIG. 6 is that the tables 81 and 91 are shown in a folded, closed position. In this view, the pillars 88 and 96 are shown in lowered positions. As such, this view illustrated that the tables 81, 91 may be moved to a lower height when in the folded, closed position as compared with the deployed, open position illustrated in FIG. 5. Therefore, in the folded, closed positions, the tables 81, 91 are presented in a coffee table orientation. In the open, deployed positions, the tables 81, 91 are in more of the conference table orientation.

It is contemplated that the pillars 88, 96 may be raised or lowered manually, pneumatically, hydraulically, or any other means suitable for the aircraft 80. The exact mechanism(s) for the raising and lowering of the tables 81, 91 is not critical to the present invention. Importantly, either of the tables 81, 91 may be raised or lowered at the preference of the passengers, flight crew, etc., as should be apparent to those skilled in the art.

In each of the Figures shown, the tables 54, 68, 81, 91 mounted on either side of the aircraft fuselage are the mirror image of each other. It is equally possible that the edges that define the aisles between pairs of conference tables 54, 68, 81, 91 may differ. They may be asymmetric. They may be parallel to the axis of the aircraft fuselage. To the extent that they are angled, in order to maintain the aisle width clearance, it is necessary that any folding portions of a table have an edge that is symmetric with or more acute with (inferior to) the edge on the opposite side of the hinge folding line.

Further, in each of the examples shown, the conference tables 54, 68, 81, 91 have a center section and opposite side sections. It is envisioned herein that a conference table 54, 68, 81, 91 may have simply two sections. The first and second sections of this alternative example may be hingedly connected on a straight line between those sections so that the table top has an unfolded, deployed position and a folded, narrowed position. It is the first section that is connected to and supported by a pillar 88, 96 underneath the table 54, 68, 81, 91. The second section may be hingedly connected to and supported by the first section. The first and second sections may be angled on one side adjacent the straight side on which they are hingedly connected. For instance, in FIGS. 3 and 4, if sections 57 and 63, respectively, were removed from the tables 54 and 68, then there would be a two-section conference table in each example. As illustrated in FIGS. 3 and 4, those two sections have angled end sides that are symmetric as shown with respect to the angle defined by the straight hinge side and the adjacent first and second section angled sides. As explained above, in order to maintain the angle with clearance consistent with the present invention, the folding portions or second sections of a table are contemplated to have an edge that is symmetric with or more acute than the edge of the center section or first section edge on the opposite side of the hinge folding line.

In the examples shown in FIGS. 3 and 4, the hinge lines 58, 65 are defined by table sections that are positioned immediately adjacent to one another. In other words, the hinge lines 58, 65 define the locations where the table sections abut against each other. It is equally envisioned that a hinge line between table sections might not be formed by immediately adjacent and abutting table sections. The present invention contemplates that a hinge line 58, 65 is established between adjacent table sections. The present invention is not intended to preclude the reliance on, for example, complex constructions, complex hinges, and complex hinging mechanisms. In other words, the present invention is intended to encompass variants that rely on more than a simple hinge connecting adjacent table sections.

Additionally, the examples herein include tables having substantially straight-line angled ends. It is these angled ends that define the width of the aisle that has been discussed herein. It is contemplated that the angled ends alternatively may be curved. To maintain an aisle width defined by a curved edge of a first table section, the present invention contemplates that the distance from the curved edge to the hinge line that is perpendicular to the hinge line may be the same as or less than the distance between the curved edge of a second table section on the opposite side of the corresponding hinge line. As such, when the second table section is folded over onto the top of the first table section, the aisle width defined by the first table section is not expected to be reduced by the configuration of the curved end of the second table section.

Within the present specification, there may be explicit or implicit references to aspects of safety. It is noted that any comments or implications with respect to safety are merely for purposes of the present discussion. As should be apparent to those skilled in the art, any furniture and/or components that are incorporated in the interior space of an aircraft are subject to various regulations in Canada, the United States, Europe and worldwide. As a result, any suggestion, whether explicit or otherwise, should not be taken as an indication that any component of an aircraft, whether currently produced or not, is more or less safe than any other component.

As indicated above, the present invention is not intended to be limited solely to the examples described and/or illustrated herein. To the contrary, there are numerous variations and equivalents that should be apparent to those skilled in the art based upon the examples described and/or illustrated herein. Those variations and equivalents are intended to be encompassed by the present invention.

What is claimed is:

1. An aircraft table for mounting adjacent an aisle of an aircraft, the table comprising:
   a first table section defining a first aisle-facing side configured to define a border of the aisle;
   a second table section hingedly connected to the first table section along a first hinge line so that the second table section is configurable between a deployed, open position and a folded, closed position, the second table section defining a second aisle-facing side; and
   a third table section hingedly connected to the first table section along a second hinge line on an opposite side of the first table section from the second table section, the third table section is configurable between a deployed, open position and a folded, closed position, the third table section defining a third aisle-facing side;
   wherein:

the first aisle-facing side defines a first angle with respect to the first hinge line and the second aisle-facing side defines a second angle with respect to the first hinge line;

the first aisle-facing side and the second aisle-facing side are adjacent the first hinge line;

the first angle is acute and the second angle is configured to cause the second aisle-facing side to maintain a clearance of the border of the aisle defined by the first aisle-facing side when the second table section is in the folded, closed position;

the third aisle-facing side is co-linear with the first aisle-facing side when the third table section is in the deployed, open position; and an outer profile of the table defines a convex polygonal shape when viewed from above in both the deployed, open position and the folded, closed position of the second and third table sections.

2. The aircraft table of claim 1, wherein the second angle is acute.

3. The aircraft table of claim 2, wherein the second angle is more acute than the first angle.

4. The aircraft table of claim 1, wherein the first angle and the second angle are substantially symmetric to each other relative to the first hinge line.

5. The aircraft table of claim 1, wherein the first table section and the second table section are directly adjacent to and abut each other when the second table section is in the deployed, open position.

6. The aircraft table of claim 1, wherein the first aisle-facing side and the second aisle-facing side are directly adjacent to each other when the second table section is in the deployed, open position.

7. The aircraft table of claim 1, wherein the first aisle-facing side and the second aisle-facing side are non-parallel when the second table section is in the deployed, open position.

8. The aircraft table of claim 1, further comprising a pillar mounted underneath the first table section to support the first table section.

9. The aircraft table of claim 8, wherein the pillar is extendable between a raised position and a lowered position.

10. The aircraft table of claim 1, wherein:
the second hinge line is parallel to the first hinge line; and
the third aisle-facing side defines an acute third angle with the second hinge line.

11. The aircraft table of claim 10, wherein the second aisle-facing side and the third aisle-facing side are non-parallel when the second table section and the third table section are in their respective deployed, open position.

12. An aircraft interior comprising:
a table mounted adjacent of an aisle of the aircraft interior;
the table having a first table section comprising a first aisle-facing side that is non-parallel to a longitudinal axis defined by a fuselage sidewall;
the first aisle-facing side defining a border of the aisle;
the table having a second table section hingedly connected to the first table section along a first hinge line so that the second table section is configurable between a deployed, open position and a folded, closed position;
the second table section defining a second aisle-facing side;
the table having a third table section hingedly connected to the first table section along a second hinge line on an opposite side of the first table section from the second table section, the third table section is configurable between a deployed, open position and a folded, closed position, the third table section defining a third aisle-facing side;

the first aisle-facing side and the second aisle-facing side being adjacent the first hinge line;

the first aisle-facing side defining a first angle with respect to the first hinge line and the second aisle-facing side defining a second angle with respect to the first hinge line;

the first angle being acute and the second angle being configured to cause the second aisle-facing side to maintain a clearance of the border of the aisle defined by the first aisle-facing side when the second table section is in the folded, closed position;

the third aisle-facing side being co-linear with the first aisle-facing side when the third table section is in the deployed, open position; and an outer profile of the table defines a convex polygonal shape when viewed from above in both the deployed, open position and the folded, closed position of the second and third table sections.

13. The aircraft interior of claim 12, wherein the second angle is acute.

14. The aircraft interior of claim 12, wherein the first angle and the second angle are substantially symmetric to each other relative to the first hinge line.

15. The aircraft interior of claim 12, wherein the first aisle-facing side and the second aisle-facing side are directly adjacent to each other when the second table section is in the deployed, open position.

16. The aircraft interior of claim 12, wherein the first aisle-facing side and the second aisle-facing side are non-parallel when the second table section is in the deployed, open position.

17. The aircraft interior of claim 12, wherein the first aisle-facing side is non-parallel to the longitudinal axis.

18. The aircraft interior of claim 12, wherein:
the second hinge line is parallel to the first hinge line; and
the third aisle-facing side defines an acute third angle with the second hinge line.

19. The aircraft interior of claim 18, wherein the second aisle-facing side and the third aisle-facing side are non-parallel when the second table section and the third table section are in their respective deployed, open position.

20. An aircraft table for mounting adjacent an aisle of an aircraft, the aircraft table comprising:
a first table section comprising a first aisle-facing side configured to define a border of the aisle;
a second table section hingedly connected to the first table section along a first hinge line oriented at an acute angle from the first aisle-facing side of the first table section, the second table section being movable between a deployed position and a folded position relative to the first table section where no part of the second table section extends across the border of the aisle defined by the first aisle-facing side of the first table section when the second table section is in the folded position; and
a third table section hingedly connected to the first table section along a second hinge line on an opposite side of the first table section from the second table section, the third table section being movable between a deployed position and a folded position relative to the first table section, the third table section defining a third aisle-facing side the third aisle-facing side being co-linear with the first aisle-facing side when the third table section is in the deployed position, wherein an outer profile of the aircraft table defines a convex polygonal shape when viewed from above in both the deployed position and the folded position of the second and third table sections.

\* \* \* \* \*